United States Patent Office 3,071,433
Patented Jan. 1, 1963

3,071,433
METHOD OF REDUCING THE HYDROGEN SULFIDE CONTENT OF INDUSTRIAL WASTE GASES
Stanley A. Dunn, East New Brunswick, N.J., assignor to Rhodia, Inc., a corporation of New York
No Drawing. Filed May 11, 1959, Ser. No. 812,083
4 Claims. (Cl. 23—2)

The present invention relates to the reduction of the hydrogen sulfide content of gaseous mixtures, and more particularly to the reduction of the hydrogen sulfide content of industrial waste gases by the catalytic oxidation of hydrogen sulfide to free sulfur.

An object of the present invention is the provision of methods for abating malodors and for reducing health hazards, vegetation destruction, paint discoloration and other air pollution nuisances caused by the hydrogen sulfide present in the off-gases and other process fumes from certain operations in industries such as kraft paper making and petroleum refining.

For example, in the manufacture of paper by the kraft process, wood chips, flax, etc., are digested under pressure with sodium hydroxide and sodium sulfide at a temperature of about 150° to 200° C. for about 2 to 4 hours. This treatment frees the cellulosic content of the wood of the other constituents, chiefly lignin, by putting the latter into solution. The cellulosic material, or pulp as it is called, is then filtered, washed and used in making paper. The filtrate, or black liquor, is treated to recover the heating value of the lignin and to recover the chemicals sodium hydroxide and sodium sulfide.

In the so-called recovery process, the black liquor is concentrated to about 60% solids and sprayed into the furnace. It is burned in two stages. The first stage is operated with insufficient oxygen so that the sodium sulfide remains in a reduced state; conditions are so much reducing that sodium sulfate, introduced at this point to compensate for sulfur losses in the system, is reduced to sodium sulfide. Most of the inorganic matter from the burning black liquor falls as slag to the bottom of the furnace where it is tapped periodically, quenched, dissolved, limed to remove carbonate, and used again in meeting the cooking requirements for sodium hydroxide and sodium sulfide.

In the second stage of burning, a slight excess of air is added to complete the combustion of the partially burned gases. The hot gases are passed through one or more heat exchangers and finally cycled back over the black liquor in large surface evaporators for the final concentration before spraying into the furnace. The final volume composition of the gases is approximately 58% $N_2$, 15% $CO_2$, 25% water vapor and 2% oxygen.

It is at this point that the so-called recovery gases pick up most of their characteristic 500 to 2000 parts per million of hydrogen sulfide, through hydrolysis of the sodium sulfide in the concentrated black liquor. In view of hydrogen sulfide's extremely unpleasant odor and low odor threshold, approximately 0.01 part per million, it is readily understood that with a high volume of gases coming out of the recovery stack there are many times when the malodor from this source is a nuisance within a radius of a number of miles. In this particular industry the odor problem, to which hydrogen sulfide is a major contributor, is a very serious one economically. In the Pulp and Paper Magazine, Canada, 24, 1381 (1926), E. Hagglund made the statement that "the growth of the sulfate pulp industry has been retarded materially owing to the inability of the manufacturer to eliminate or reduce the presence of undesirable odors in the mill and its surroundings." As a result, uneconomical locations are necessarily selected for the paper mills. Besides malodor, the presence of hydrogen sulfide in the atmosphere can cause darkening of paints as well as, in extreme cases, damage to plant life and even harm to human health.

In the presence of high turbulence and good winds and when noninversion conditions prevail, the atmosphere soon disperses and elevates hydrogen sulfide containing gases, such as those from the kraft paper mill recovery stacks, to the point where the nuisance values of the hydrogen sulfide are eliminated. In addition there is a slow oxidation of hydrogen sulfide by the atmopheric oxygen to produce the innocuous end products, water and elemental sulfur.

During inversion conditions, however, the atmosphere is incapable of carrying the stack gases above a certain height, namely that of the inversion layer, which may be quite close to the ground level. When the inversion condition is coupled with low wind velocities and a corresponding minimum of turbulence, as is frequently the case, there is relatively little dispersion of the hydrogen sulfide and no removal to higher altitudes. Under such conditions, oxidation by the air becomes relatively much more important as a means of lowering the hydrogen sulfide concentration. But as the natural atmospheric oxidation of $H_2S$ proceeds only very slowly, the odors of the hydrogen sulfide containing recovery gases of kraft paper mills for example are often detectable at a distance of 20 miles.

It is, therefore, a further object of the present invention to provide a simple process for speeding up the natural atmospheric destruction, by oxidation, of the hydrogen sulfide contained in the process fumes from such industries as kraft paper making, to the point where malodors due to the hydrogen sulfide are appreciably abated. It is also an object of this invention to provide a simple process for speeding up the natural atmospheric destruction, by oxidation, of the hydrogen sulfide contained in the process fumes from such industries as kraft paper making, to the point where darkening of paint, damage to plant life and other nuisances due to hydrogen sulfide are greatly reduced if not eliminated.

It has been known for many years that the rate of oxidation of hydrogen sulfide to free sulfur may be increased by catalysis. In Engelhardt U.S. Patent No. 1,479,852, January 8, 1924, a method of catalyzing the oxidation of hydrogen sulfide to free sulfur was disclosed in which a heterogeneous solid-vapor catalysis mechanism was effected by passing a gas containing hydrogen sulfide through a bed of active carbon, which served as an extended surface catalyst. It was also disclosed that the process was further improved by the addition of ammonia or amines.

This process, however, was attended by considerable evolution of heat, so that molten elemental sulfur was produced, which clogged up the reaction chamber. Also, the fused sulfur was extremely difficult to remove from the catalyst bed when catalyst regeneration became necessary.

Accordingly, the prior art proposed an improvement over this process, as in Herold et al.'s U.S. Patent No. 1,984,971, December 18, 1934. According to this improved process, the gas to be treated was passed through extended surface solid catalyst beds in a plurality of stages, with cooling between stages. In this way, the heat of reaction was stepwise removed so that the temperature of no catalyst bed exceeded the fusion temperature of the deposited sulfur. The sulfur was accordingly deposited on the catalyst in a form which was easier to remove. The improved process, however, had the disadvantages that it operated at lower temperature and hence required substantially larger catalyst beds. Also, it was necessary to alter the course of the gas through the various catalyst beds at short intervals so as to place the beds off-cycle serially and to pass the gas through the beds in the reverse order of their deposited sulfur content, all of which required considerable manipulation and control of the process.

Another great disadvantage of the prior art, whether represented by the original or the modified processes described above, was that the solid-vapor heterogeneous catalysis of hydrogen sulfide to free sulfur, regardless of whether supplemented by ammonia or amines, required the forcible passage of gas through extensive beds of solid catalyst. In view of the inevitable pressure drop through the catalyst beds, stack draft could not be used to draw the gases through the beds. Instead, gas pumps or fans were necessary to move the gases through the catalyst beds. Particularly in the case of large industrial installations producing enormous quantities of waste gases, the size and expense of the gas-handling plant alone required to move the gas through the catalyst beds becomes a considerable expense. Add to this the necessity of employing a continuous catalyst regeneration system for removing the sulfur from the solid catalyst, and it is seen that the equipment for removing hydrogen sulfide from the gas by these earlier methods amounts by itself to a sizeable industrial installation.

Hence, a still further object of the present invention is the provision of methods for catalyzing the oxidation of hydrogen sulfide to free sulfur, in which there is no need to provide catalyst bed, gas-handling equipment, catalytic reaction chambers or catalyst regeneration equipment, and in which, in fact, there is need for only the simplest modification of existing equipment.

Other objects and advantages of the present invention will appear as the description of the invention proceeds.

Broadly stated, the present invention comprises a double discovery. The first discovery is that, quite apart from the prior art heterogeneous solid-vapor phase catalysis of the oxidation of hydrogen sulfide to free sulfur in the presence of ammonia and amines, there is a homogeneous fluid phase catalysis of the oxidation in the presence of ammonia and certain amines. The second discovery is the discovery of an industrial process by which this newly discovered catalysis may be used to reduce the hydrogen sulfide content of industrial waste gases with a minimum of expense, equipment, effort and supervision. This process comprises the steps of admixing with waste gases containing small amounts of hydrogen sulfide a small amount of a compound in fluid phase selected from the class consisting of ammonia, aliphatic amines, and alicyclic amines, and immediately thereafter discharging to the atmosphere the waste gas containing the compound and substantially all the original hydrogen sulfide.

At temperatures below about 80° C., the fluid phase homogeneous catalysis of the present invention proceeds more rapidly in liquid phase than in vapor phase. Therefore, although the catalysis may proceed either in liquid phase or in vapor phase, liquid phase is preferred. Hence, a preferred mode of practicing the invention is to introduce the catalyst into the waste gases in liquid phase in the form of a fine spray to promote the absorption of hydrogen sulfide and oxygen into the liquid phase by dissolution in the catalyst or in a solution of the catalyst.

The initial temperature of the off-gases or stack gases into which the catalyst is introduced is largely immaterial to the present invention. These gases are promptly discharged to the atmosphere, where their temperature, if initially elevated, rapidly approaches ambient atmospheric temperature through cooling and dilution, and there is no discernible heating of the atmosphere that could be ascribed to a reaction exotherm. As would be expected, the catalyzed reaction rate of the present invention increases with temperature; but in view of this rapid cooling of the treated gases, substantially all of the conversion of hydrogen sulfide to free sulphur occurs at temperatures at or not much above ambient. At those temperatures, due primarily to a rapid salt formation with hydrogen sulfide, the vapor pressure of the catalyst is in most instances quite low, so that when the catalyst is employed in the preferred liquid phase, there is little vaporization of the catalyst and the homogeneous catalysis of the invention continues to proceed primarily in liquid phase.

A further distinctive characteristic of the present invention is its catalyzed reaction rate. The prior art heterogeneous catalysis using solid bed catalyst effects total conversion of the hydrogen sulfide in only a single pass through the bed at elevated temperatures; or when special precautions are taken to cool the processed gas, total conversion of the hydrogen sulfide is effected by passage through only several catalyst beds. Hence, the heterogeneously catalyzed reaction rate is extremely rapid.

By contrast, the homogeneously catalyzed reaction rate of the present invention is relatively quite low. Indeed, the conversion of hydrogen sulfide to free sulfur in the atmosphere, as catalyzed by the present invention, proceeds at only several percent of the hydrogen sulfide per hour. Compared with the prior art heterogeneous catalysis, the homogeneously catalyzed reaction rate of the present invention is negligible; and homogeneous catalysis as an incident to the prior art heterogeneous catalysis, if it occurred at all, was imperceptible. But compared to the natural uncatalyzed rate of oxidation of hydrogen sulfide to free sulfur in the atmosphere, the catalyzed reaction rate of the present invention is quite high, amounting to a number of times the natural rate.

At first glance, therefore, it might appear that the present discovery of the homogeneous catalysis mechanism is of little value for the treatment of large quantities of gas containing small amounts of hydrogen sulfide, as the homogeneously catalyzed reaction rate is so much lower than the rate of the reaction as heterogeneously catalyzed by the prior art. The treatment time for the slower reaction must of course be longer than for the more rapid reaction, and hence in the continuous treatment of gas at the high flow rates encountered in industry, the total quantities of gas under treatment by the present invention at any time will be enormous. It would seem obvious that the equipment required to handle such an enormous volume of gas would render hydrogen sulfide conversion by homogeneous catalysis economically entirely unfeasible.

Accordingly, it is of the essence of the present invention that a gas handling and treating method has been developed which fully utilizes the advantages of homogeneous catalysis as compared to natural atmospheric oxidation, but which at the same time avoids all of the apparent disadvantages of homogeneous catalysis as compared to the known heterogeneous catalysis. As noted above, this method comprises the admixture of the catalyst in fluid phase with the waste gases and the prompt discharge of the waste gases to the atmosphere. Thus, the present invention takes advantage of the fact that by homogeneous catalysis the gas undergoing treatment need not contact any solid surfaces, but at the same time the present invention avoids the need for an enormous catalytic reaction chamber; for in the present invention, it is literally true that the reaction chamber is as big as all outdoors.

Moreover, the present invention requires no gas handling equipment. The introduction of small quantities of catalyst in fluid phase into waste gases leaving an industrial installation in no way alters the natural flow characteristics of those gases. For example, the same stack draft which discharges untreated waste gases is equally effective to discharge waste gases treated according to the present invention.

Stack draft and stack turbulence further contribute to the present invention by providing a convenient and highly satisfactory way of thoroughly mixing the fluid phase catalyst with the gases to be treated, as for example by distributing particles of catalyst mist or spray uniformly throughout the gas. Hence, a preferred point of introduction of the catalyst is prior to complete passage of the gas up and out the top of the discharge stack. In this way, the waste gases, after introduction of the catalyst, are passed through an elongated open-ended conduit thereby thoroughly to mix the catalyst with the gas. The time of passage through the conduit between treatment and discharge is usually quite short, for example, about two seconds or less.

The introduction of the catalyst into the gases is also quite simple and involves very little apparatus. All that is needed is a conventional small spray device or flash evaporator, to discharge for example within a stack intermediate the length of the stack.

Also, there is no problem of catalyst reactivation. The catalyst is quite cheap and is used only in small quantities and is carried off in the waste gases to perform its catalytic function in the open air.

Furthermore, there is no problem of removed sulfur disposal. The treated gases remain in the stack or other gas discharge conduit for only a short time after treatment, and conversion of hydrogen sulfide to free sulfur in the stack is negligible. Hence, substantially all the conversion takes place in the open air over a very wide area. Apparently, the free sulfur settles out as an innocuous fine dust over a large area of the surrounding countryside and is washed away from time to time by rainfall.

Also, there is no problem of temperature control associated with the present invention. Whatever temperature level the treated and discharged waste gases normally seek in view of the ambient atmospheric temperature is quite suitable for purposes of the invention. Hence, there is no need for the gas handling and heat exchange equipment heretofore necessitated by the strongly exothermic nature of the heterogeneously catalyzed reaction.

Still another advantage of the present invention is that it is operative entirely independently of the oxygen concentration of the waste gases to be treated. The treated waste gases are discharged promptly to the atmosphere and are rapidly diluted with air, so that the oxygen concentration quickly builds up to many times that stoichiometrically required to oxidize the hydrogen sulfide. As would be expected, the higher the oxygen concentration, the more rapid the reaction. Hydrogen sulfide conversion in the stack is negligible in any event; and hence, it is immaterial whether the gas to be treated contains any oxygen at all, for it quickly receives a desirably great excess of oxygen upon discharge to the atmosphere. Thus, the present invention entirely avoids the gas handling problems heretofore associated with supplying air or oxygen to gases which are to be catalytically treated for hydrogen sulfide removal, for even in the case of gases entirely devoid of oxygen a desirably great excess of oxygen is rapidly and automatically built up simply by the practice of the present invention and with no special equipment at all.

In short, what goes on in the stack merely sets the stage for the later destruction of hydrogen sulfide in the surrounding atmosphere. Practically as much hydrogen sulfide is discharged from the stack in the present invention as if the present invention were not practiced. The difference, however, is that the subsequent destruction of the hydrogen sulfide is a number of times faster than if the present invention were not practiced. The result is that the area surrounding the industrial installation and which from time to time would be adversely affected by the discharged hydrogen sulfide is greatly reduced.

In view of the fact that hydrogen sulfide is still discharged in quantity when the present invention is practiced, it must be emphasized that there still remains a region about the installation which would from time to time be polluted by hydrogen sulfide. The significance of the present invention, however, is that the area of this region is greatly reduced by the present invention. For example, let it be assumed that by the invention under a given set of conditions a five-fold increase in the hydrogen sulfide oxidation rate over the natural atmospheric rate is obtained, a result that is quite easily achieved in practice. Let it also be remembered that the severest and most far-reaching air pollution occurs during periods of low level atmospheric inversion, when wind velocity and hence turbulence are at low values, and that there is almost always some prevailing wind, however slow and whatever its direction. Hence, at any time, the area polluted by emitted hydrogen sulfide will usually be quite elongated relative to its width, with the emitting installation at one end of the elongated area. Depending on the wind direction, this area will extend in any direction from the installation, so that the total region which from time to time will be polluted can be roughly circumscribed by a circle of a radius equal to the length of the elongated area and having the installation at its center.

If the rate of hydrogen sulfide destruction is increased five-fold over normal, the length of the elongated polluted area is reduced by a factor of about five. The radius of the circle is thus cut by four-fifths, and a new circle is inscribed within the first circle, the new circle representing the smaller region polluted from time to time when the invention is practiced. As the radius of the large circle is five times that of the small circle, the area of the large circle, which varies as the square of its radius, is 25 times that of the small circle. Thus a five-fold increase in reaction rate reduces the area which will from time to time be polluted by a factor of 25. In other words, an increase in the reaction rate effects a correspondingly much greater increase in the area freed from hydrogen sulfide pollution.

Apart from the normal influence of dilution on fluid phase reaction mechanism, the mechanism of the present invention is apparently independent of the concentration of hydrogen sulfide in the gas to be treated. On the other hand, it goes without saying that gases very high in hydrogen sulfide content will under no circumstances be discharged in large quantities to the atmosphere. Hence, the present invention has its primary utility in the treatment of waste gases having low but appreciable concentrations of hydrogen sulfide, preferably not more than about 1 mol percent. Most of the industrial waste gases to be treated according to the present invention fall within the range of hydrogen sulfide concentration of 10 to 10,000 parts per million of hydrogen sulfide; and the present invention is principally concerned with reducing those concentrations toward the odor threshold for hydrogen sulfide in a gaseous mixture, which is ordinarily considered to be about 0.01 part per million by weight. A hydrogen sulfide concentration of 500 to 2,000 parts per million, for example, is characteristic of the kraft process.

For these commonly commercially encountered concentrations of hydrogen sulfide, only a very small amount of catalyst will be used relative to the total stack gases, usually from 1 or even less, to about 10,000 parts per million, and preferably from 5 to 100 parts per million. In general, the more the catalyst the higher the reaction rate, as would be expected in the case of an extremely dilute reaction medium such as is provided by the unconfined atmosphere. Of course, the cost of the catalyst makes it necessary to strike a balance between the desired reaction rate and the expense of achieving that rate. The catalyst of course is not required in stoichiometric amounts and in general will be used in an amount which is only a tiny fraction by weight of the weight of the hydrogen sulfide. For example, a hydrogen sulfide to catalyst weight ratio of 100 to 1 has been found to be both effective and economical.

As indicated above, the preferred method for introducing the catalyst into the gas to be treated is in finely divided liquid phase in the form of a fine spray. Such a spray may, for example, conveniently contain particles falling primarily in the range of 1 to 50 microns in diameter. For purposes of introducing the catalyst in the form of a liquid spray, the catalyst may be at full strength; but it is preferred that the catalyst be dissolved in a solvent for ease of handling and accuracy of metering. Among the suitable solvents are water, aliphatic alcohols, glycol, glycol ether, or other oxygenated solvent having sufficient solvent power for the catalyst. Refined or crude sulfate turpentine mixed with alcohol to improve its solvent power may be used. The organic solvents are preferred. If a solvent is used, the concentration of the catalyst in the solvent may conveniently range from about 0.1% to virtually 100% by weight. The figure of 0.1% by weight does not represent any known lower threshold of catalytic activity but is merely an arbitrary figure below which the volume of solution becomes so large as to be difficult to handle. From a chemical standpoint there is no reason to believe that improvement in the reaction rate cannot be achieved at still much lower concentrations of catalyst in solvent.

Apart from the usual influence of pressure on fluid phase reactions, the reaction rates obtained by the present invention appear to be independent of pressure, so that gas treatment may be conveniently conducted at pressures at or near atmospheric.

As indicated above, the nitrogenous compounds effective as catalysts for purposes of the present invention, in addition to ammonia, are aliphatic and alicyclic amines. The aliphatic amines may be primary, secondary or tertiary amines or they may be polyamines. The alicyclic amines may be heterocyclic or homocyclic.

Examples of operative aliphatic primary amines are monoethanolamine, methionine (d,l), methylamine, ethylamine, n-propylamine, sec-butylamine, 1-methyl-1-ethyl butylamine, n-nonylamine, laurylamine, 2-ethyl-3-methyl octylamine, n-octadecylamine, 1-butyl-3-methyl-7-ethyl decylamine, 4-amino-1-butene, hexylamine, amylamine, 2-hydroxyethyl-3-aminopropyl ether, 9-octadecen-1-amine, 9,12-octadecadien-1-amine, 9,12,15-octadecatrien-1-amine and 2-ethyl hexylamine.

Examples of operative aliphatic secondary amines are diethanolamine, dimethylamine, diethylamine, dihexylamine, N-methyl butylamine, di-(2-ethylhexyl) amine, diallylamine, dipropylamine, N-ethyl ethanolamine, N-isopropyl ethanolamine, N-ethyl dodecylamine, N-butyl octylamine, didecylamine and hexadecylamine.

Examples of operative aliphatic tertiary amines are triethanolamine, trimethylamine, triethylamine, 9,12-octadecadiene diethanolamine, N,N-dibutyl methyamine, N,N-diisopropyl ethanolamine, N,N-di(2-ethylhexyl) ethanolamine, N-methyl diethanolamine, N-butyl diethanolamine, N,N-diethyl isopropanolamine and triiso-octylamine.

Examples of operative aliphatic polyamines are ethylenediamine, triethylenetetramine, N-(3-aminopropyl) dodecylamine, diethyl (3-aminopropyl) amine, diethylenetriamine, 1,3-diaminopropane, 1,2-diaminopropane, bis(2-aminopropyl) amine, N,N,N,'N' - tetramethyl - 1,3-butanediamine, N,N'-di(2-hydroxyethyl) ethylenediamine and ethyl di(3-aminopropyl) ether.

Examples of operative alicyclic amines are, for the heterocyclics, piperazine, 1,4 - bis(2-hydroxypropyl)-2-methyl piperazine, N-methyl piperazine, 2,5 - dimethyl piperazine, N-aminoethyl piperazine, 2,6-dimethyl morpholine, N-methyl morpholine, N-hydroxyethyl morpholine and N-(3-aminopropyl) morpholine; and for the homocyclics, cyclohexylamine, N-(2-ethylhexyl) cyclohexylamine and N-ethyl cyclohexylamine.

The presence of unsaturated linkages in the aliphatic carbon chains is not detrimental to the catalysis. The carbon chains or saturated rings may be unsubstituted or may be substituted with such groupings, for example, as hydroxyl, ether, ester, amide, ketone, halogen, nitro, carboxyl or methyl sulfide.

With further regard to operation under conditions of liquid phase homogeneous catalysis, as for example by spraying, it will be noted that most of these amines are liquid at room temperature and can be used full strength if desired or in admixture in the solvents noted above. Ammonia and some of the amines such as methylamine, ethylamine, dimethylamine and trimethylamine are gaseous at room temperature and can be used in vapor phase; but they are also water-soluble and can be used in aqueous solution in concentrations of, say 20% by weight or less. Some of the amines are solid or nearly so at room temperature and should be used in solution. Of these, some such as laurylamine, 2-ethyl-3-methyl octylamine, n-octadecylamine, 1-butyl-3-methyl-7-ethyl decylamine, 9-octadecen-1-amine, 9,12-octadecadien-1-amine, 9,12,15-octadecatrien-1-amine, N-ethyl dodecylamine and N-butyl octylamine are more or less oil-soluble and can be used in concentrations of, say, 10% by weight or less in solution in propylene glycol, dipropylene glycol or other similar glycols or lower aliphatic alcohols up through decanol. Some other, such as 2-hydroxyethyl-3- aminopropyl ether, N,N' - di(2-hydroxyethyl) ethylenediamine and 2,5-dimethyl piperazine are water soluble and can be used in concentrations of, say, 2 percent by weight or less in solution in water, the glycols or the lower aliphatic alcohols.

In order to enable those skilled in this art to practice the invention, the following illustrative examples are given:

EXAMPLE 1

A 3.1% by weight solution of triethanolamine was established in a solvent containing 89.5% water, 9.7% butanol, 0.5% polyethylene glycol ether of an alkylated phenol, 0.1% miscellaneous aromatic oils and 0.1% copper oleate, by weight. The solution was sprayed into the recovery stack of a kraft paper mill, the particles of spray ranging primarily from 1 to 50 microns in diameter. Passing upwardly through this stack at a velocity of about 50 feet per second was waste gas containing approximately 58% nitrogen, 15% carbon dioxide, 25% water vapor and 2% oxygen, these percentages being mol percentages. This gas had a hydrogen sulfide content which averaged about 900 parts per million. The spray was introduced about 100 feet below the top of the stack at a rate of 1 part per million of triethanolamine based on the weight of the gases. The stack gas had a temperature of about 82° C. at the points of introduction, and this temperature dropped toward the ambient temperature of about 26° C. after discharge. By the periodic aanalysis of gas samples taken from outside the stack both before and during introduction of the amine solution into the stack gases, it was determined that the rate of oxidation of hydrogen sulfide to free sulfur in the discharged gases containing the amine was about twice the normal atmospheric oxidation rate without the amine.

EXAMPLE 2

Example 1 was repeated, but with two differences. First, a 24% by weight solution of triethanolamine was used, the solvent containing 93.5% butanol, 4.9% polyethylene glycol ether of an alkylated phenol, 1.0% miscellaneous aromatic oils and 0.6% copper oleate, by weight. Second, the amine solution was sprayed into the stack at a rate of 8 parts per million of amine based on the weight of the gases. The catalyzed oxidation rate of hydrogen sulfide was determined to be 5 times the uncatalyzed rate.

EXAMPLE 3

A 1.3% by weight solution of monoethanolamine was established in a solvent consisting of 88.0% water, 6.0% copper oleate, 5.3% polyethylene glycol ether of an alkylated phenol and 0.7% of miscellaneous aromatic oils, by weight. In order to test the effect of the invention on the odor threshold of hydrogen sulfide, this solution was sprayed into stack gases as in Example 1, at a rate of 0.5 part per million of amine based on the weight of gases. By practice of the invention in this manner, the malodor of hydrogen sulfide normally encountered within a ten to twenty mile radius of the mill was abated as compared to conditions when the invention was not practiced.

EXAMPLE 4

Example 3 was repeated, but the amine solution of Example 2 was used, in an amount of 1 part per million of amine based on the weight of the gases. Again, the malodor of hydrogen sulfide normally encountered within a ten to twenty mile radius of the mill was abated.

EXAMPLES 5 THROUGH 17

In order to study possibilities of varying the composition of the nitrogenous catalyst, the effect of dilution in a solvent, and various suitable solvents, it was necessary to perform a series of tests in which these factors were subject to variation. At the same time, it was obviously impossible to conduct the testing program in connection with a full-scale industrial installation, as the running of a test on a full industrial scale is a considerable undertaking.

Therefore, a test procedure was devised which would show unmistakably the operative embodiments and operative conditions of the present invention but on a laboratory scale. To do this, an abnormally high hydrogen sulfide content was provided in the test gases and the oxygen content was increased to a maximum. Also, the tests were run at elevated temperature. All three of these factors coact to give a reaction rate enormously higher than that to be encountered under actual conditions, but which is still nicely indicative of the relationships to each other of the reaction rates to be encountered in practice.

Accordingly, a gaseous mixture at 1 atmosphere total pressure, containing 1 mol percent of hydrogen sulfide and 99% of oxygen was passed lengthwise at 5 ml./sec. through a cylindrical chamber 1 cm. in diameter by 25 cm. long, of which the walls were wetted with a liquid containing (A) weight percent of (B) in (C), as a solvent, at a temperature of 70° C. The hydrogen sulfide content of the off-gases was decreased by (M) percent, the hydrogen sulfide loss appearing as free sulfur. The values which were found for the above letters are given in the following Table I. Under conditions otherwise identical but for the absence of the nitrogenous catalyst, there was no detectable loss of hydrogen sulfide in the gaseous mixture.

Table I

| Example | A, weight percent | B | C | M (percent) |
|---|---|---|---|---|
| 5 | 5.0 | Monoethanolamine | Alcohol 39-C (1% by volume diethyl phthalate in 190-proof aqueous ethanol). | 34 |
| 6 | 1.0 | ___do___ | Alcohol 39-C plus 3% water. | 11 |
| 7 | 1.0 | ___do___ | Alcohol 39-C plus 9% water. | 31 |
| 8 | 0.28 | Ammonia | Alcohol 39-C | 14 |
| 9 | 1.0 | Monoethanolamine | Water | 14 |
| 10 | 0.92 | KOH | 190-proof aqueous ethanol. | 0 |
| 11 | 1.0 | Monoethanolamine | ___do___ | 33 |
| 12 | 1.0 | ___do___ | p-Dioxane | 8 |
| 13 | 2.1 | N-(3-aminopropyl) dodecyclamine. | ___do___ | 15 |
| 14 | 6.0 | 9,12 octadecadiene diethanolamine. | o-Dichlorbenzene | 12 |
| 15 | 6.0 | ___do___ | 190-proof aqueous ethanol. | 14 |
| 16 | 10.0 | Monoethanolamine | ___do___ | 7 |
| 17 | | | Alcohol 39-C | 0 |

EXAMPLES 18 THROUGH 23

To demonstrate the vapor phase homogeneous catalysis under validly indicative laboratory conditions as in the immediately proceeding set of examples, a gaseous mixture at 1 atmosphere total pressure containing 1 mol percent of hydrogen sulfide, (A) mole percent of oxygen, (B) mol percent of nitrogen, and (C) mol percent of monoethanolamine in vapor phase was passed through a glass tube 5.8 millimeters in diameter by 196 centimeters long, maintained at a temperature of (D) ° C. The hydrogen sulfide content of the off-gas was decreased by (E) percent, as given in the following Table II. Under conditions otherwise identical but for the absence of the amine, there was no detectable decrease in the hydrogen sulfide.

Table II

| Example | A (mol percent) | B (mol percent) | C (mol percent) | D (° C.) | E (mol percent) |
|---|---|---|---|---|---|
| 18 | 99 | 0 | 0.21 | 69 | 28 |
| 19 | 21 | 77 | 0.23 | 70 | 16 |
| 20 | 99 | 0 | 0.28 | 80 | 14 |
| 21 | 99 | 0 | 0.50 | 120 | 18 |
| 22 | 99 | 0 | 0.37 | 119 | 18 |
| 23 | 99 | 0 | 0.28 | 173 | 21 |

Although in all experiments all materials were initially introduced in vapor phase, in the three lower temperature experiments they did not all remain in that state. In these experiments a liquid phase formed immediately upon admixture of the hydrogen sulfide into remaining gases. This liquid deposited on the reactor walls from the admixture point on, in steadily diminishing amount, to adjacent the end of the reactor. The major part of the hydrogen sulfide lost was recovered as free sulfur from this condensed liquid, indicating that a reaction had taken place which started out, at least, in the homogeneous vapor phase.

In the three higher temperature experiments, only very small deposits could be found on the reactor walls. In each case, however, the gas mixture issued from the reactor as a white fog, a phenomenon not observed at the lower temperatures. The particles making up this fog were of course in a condensed state; nevertheless, the reactions leading to their production must have taken place practically entirely in vapor phase.

EXAMPLES 24 THROUGH 43

To demonstrate the preferred method of catalyst introduction by spraying, under validly indicative laboratory conditions, and also to demonstrate further embodiments of the catalysts and to establish that the catalyst is useful in full strength as well as in solution, a gaseous mixture at 1 atmosphere total pressure containing (A) mol percent hydrogen sulfide, (B) mol percent oxygen, (C) mol percent carbon dioxide, and (D) mol percent nitrogen was passed lengthwise under conditions of laminar flow at 5 ml./sec. through a chamber 55 mm. in diameter by 208 cm. in length maintained at a temperature (E) ° C., and was sprayed at a rate of (F) mg./sec. with a solution (G) weight percent of (H) in (I) as a solvent. The hydrogen sulfide content of the resulting off-gases was reduced by (J) percent, the hydrogen sulfide loss appearing as free sulfur. The values for the above letters are given in the following Table III. Under conditions otherwise identical but for the presence of a nitrogenous catalyst, no detectable loss of hydrogen sulfide occurred.

Table III

| Example | A (mol percent) H₂S | B (mol percent) O₂ | C (mol percent) CO₂ | D (mol percent) N₂ | E (°C.) | F (mg./sec.) | G (weight percent) | H (catalyst) | I (solvent) | J (percent) |
|---|---|---|---|---|---|---|---|---|---|---|
| 24 | 0.25 | 39 | 19 | 42 | 72 | 0.0042 | 100 | Triethanolamine | | 37 |
| 25 | 0.25 | 39 | 19 | 42 | 73 | 0.0057 | 100 | ___do___ | | 31 |
| 26 | 0.25 | 39 | 19 | 42 | 74 | | 100 | | | 1 |
| 27 | 0.24 | 3.2 | | 18 | 72 | 0.0017 | 100 | Triethanolamine | | 9 |
| 28 | 0.12 | 84 | 0 | 16 | 70 | 0.0056 | 100 | Triethylenetetramine | | 23 |
| 29 | 0.12 | 84 | 0 | 16 | 100 | 0.0073 | 100 | ___do___ | | 48 |
| 30 | 0.12 | 84 | 0 | 16 | 100 | 0.0047 | 100 | ___do___ | | 36 |
| 31 | 0.12 | 3.9 | 20 | 76 | 70 | 0.023 | 33.3 | Ethylenediamine | Triethylene glycol | 79 |
| 32 | 0.12 | 4.0 | 20 | 76 | 68 | 0.0117 | 33.3 | Piperzaine (anh.) | Propylene glycol | 69 |
| 33 | 0.12 | 3.9 | 20 | 76 | 68 | 0.105 | 10.0 | Ammonia | Triethylene glycol (65.8%) and water. | 41 |
| 34 | 0.12 | 4.0 | 20 | 76 | 68 | 0.0998 | 5.0 | Methionine (d,l) | Water | 12 |
| 35 | 0.12 | 3.9 | 20 | 76 | 70 | 0.0170 | 50 | 2-ethyl hexylamine | Triethylene glycol | 46 |
| 36 | 0.12 | 3.9 | 20 | 76 | 70 | 0.0077 | 100 | Dodecylamine | | 23 |
| 37 | 0.12 | 3.9 | 20 | 76 | 70 | 0.0144 | 100 | Triisooctylamine | | 19 |
| 38 | 0.12 | 3.9 | 20 | 76 | 70 | 0.0173 | 100 | 1,4 - bis(2 - hydroxy - propyl) - methyl piperazine. | | 25 |
| 39 | 0.12 | 3.9 | 20 | 76 | 70 | 0.0163 | 20 | Hexadecylamine | Decyl alcohol | 45 |
| 40 | 0.12 | 3.9 | 20 | 76 | 70 | 0.0136 | 50 | Diethyl(3 - aminopropyl) amine. | Triethylene glycol | 60 |
| 41 | 0.12 | 3.9 | 20 | 76 | 60 | 0.0173 | 50 | ___do___ | ___do___ | 56 |
| 42 | 0.12 | 3.9 | 20 | 76 | 50 | 0.0119 | 50 | ___do___ | ___do___ | 39 |
| 43 | 0.12 | 3.9 | 20 | 76 | 23 | 0.0138 | 50 | ___do___ | ___do___ | 22 |
| 44 | 0.12 | 3.9 | 20 | 76 | 70 | 0.0294 | 50 | Cyclohexylamine | ___do___ | 34 |

Although the present invention has been disclosed in connection with preferred embodiments, it is to be understood that modifications and variations may be resorted to without departing from the spirit of the invention, as those skilled in this art will readily understand. Such modifications and variations are considered to be within the purview and scope of the present invention as defined by the appended claims.

What is claimed is:
1. A method of reducing the hydrogen sulfide content of industrial waste gases by the homogeneous fluid phase catalytic oxidation of hydrogen sulfide to free sulfur, comprising the steps of admixing with waste gas containing a small amount of hydrogen sulfide, a small amount of a compound in fluid phase selected from the class consisting of ammonia, aliphatic amines and alicyclic amines, and discharging the mixture of the waste gas, said compound and substantially all the hydrogen sulfide to the atmosphere.

2. A method of reducing the hydrogen sulfide content of industrial waste gases by the homogeneous liquid phase catalytic oxidation of hydrogen sulfide to free sulfur, comprising the steps of spraying into waste gas containing a small amount of hydrogen sulfide, a small amount of a compound in liquid phase selected from the class consisting of ammonia, aliphatic amines and alicyclic amines, and discharging the mixture of the waste gas, said compound and substantially all the hydrogen sulfide to the atmosphere.

3. A method of reducing the hydrogen sulfide content of industrial waste gases by the homogeneous fluid phase catalytic oxidation of hydrogen sulfide to free sulfur, comprising the steps of introducing into waste gas containing a small amount of hydrogen sulfide, a small amount of a compound in fluid phase selected from the class consisting of ammonia, aliphatic amines and alicyclic amines, passing the waste gas containing the hydrogen sulfide and said compound through an elongated open-ended conduit to mix said compound in the waste gas, and discharging the mixture of the waste gas, said compound and substantially all the hydrogen sulfide to the atmosphere.

4. A method of reducing the hydrogen sulfide content of industrial waste gases by the homogeneous liquid phase catalytic oxidation of hydrogen sulfide to free sulfur, comprising the steps of spraying into waste gas containing a small amount of hydrogen sulfide, a small amount of a compound in liquid phase selected from the class consisting of ammonia, aliphatic amines and alicyclic amines, passing the waste gas containing the hydrogen sulfide and said compound through an elongated open-ended conduit to mix said compound in the waste gas, and discharging the mixture of the waste gas, said compound and substantially all the hydrogen sulfide to the atmosphere.

References Cited in the file of this patent
UNITED STATES PATENTS
1,479,852   Engelhardt _____ Jan. 8, 1924
FOREIGN PATENTS
312,769   Great Britain _____ June 6, 1929